United States Patent [19]

Hurd et al.

[11] Patent Number: 4,741,399
[45] Date of Patent: May 3, 1988

[54] OIL RECOVERY PROCESS UTILIZING GRAVITATIONAL FORCES

[75] Inventors: B. George Hurd, Coppell; Lloyd G. Jones, Dallas; Lloyd K. Strange, Grand Prairie, all of Tex.

[73] Assignee: Mobil Oil Corporation, New York, N.Y.

[21] Appl. No.: 265

[22] Filed: Jan. 2, 1987

[51] Int. Cl.$^4$ ............................................. E21B 43/22
[52] U.S. Cl. .................... 166/273; 166/269
[58] Field of Search ................... 166/268, 269, 273

[56] References Cited

U.S. PATENT DOCUMENTS

| | | | |
|---|---|---|---|
| 3,139,929 | 7/1964 | Habermann | 166/273 |
| 3,221,810 | 12/1965 | Marx | 166/269 |
| 3,302,710 | 2/1967 | Odeh | 166/269 |
| 3,667,545 | 6/1972 | Knight | 166/273 X |
| 3,700,031 | 10/1972 | Germer, Jr. et al. | 166/273 X |
| 3,710,861 | 1/1973 | Steeg | 166/273 X |
| 3,977,470 | 8/1976 | Chang | 166/273 |
| 4,079,785 | 3/1978 | Hessert et al. | 166/273 |
| 4,122,895 | 10/1978 | Sitton et al. | 166/273 X |
| 4,240,504 | 12/1980 | Reed | 166/273 |
| 4,250,961 | 2/1981 | Morse et al. | 166/273 X |

FOREIGN PATENT DOCUMENTS

| | | | |
|---|---|---|---|
| 51706 | 5/1969 | Romania | 166/273 X |
| 1021607 | 3/1966 | United Kingdom | 166/268 |

*Primary Examiner*—George A. Suchfield
*Attorney, Agent, or Firm*—Alexander J. McKillop; Michael G. Gilman; Stanislaus Aksman

[57] ABSTRACT

There is disclosed a method of recovering oil from a subterranean oil formation having the vertical thickness of 40 ft or more. The method exploits the effect of gravity on the various slugs of diverse materials injected into the oil column of the formation. The method comprises injecting a surfactant slug into the lower 50-75% of the vertical thickness of the oil column, then injecting a slug of a mobility control polymer into the upper 50-75% portion of the thickness of the oil column, followed by the injection of a slug of a drive fluid over substantially the entire vertical thickness of the oil formation. Optionally, a low-salinity pre-flush slug may be injected to remove high salinity water from contact with the oil and an alkaline pre-treat solution may be injected to remove divalent ions prior to the injection of the surfactant slug.

31 Claims, No Drawings

OIL RECOVERY PROCESS UTILIZING GRAVITATIONAL FORCES

BACKGROUND OF THE INVENTION

I. Field of the Invention

The invention is directed to an improved method of recovering oil from underground, relatively thick oil formations. More particularly, the invention is directed to the recovery of oil from such formations wherein a surfactant and a mobility control agent, alone or with additional optional agents, are injected into the formation at predetermined, vertically-spaced portions of the oil formation.

II. Description of the Prior Art

In the recovery of oil from subterranean formations, the oil is usually initially extracted by primary recovery techniques which rely on the naturally-occurring reservoir pressure forces to provide the pressure necessary to recover the oil. Once the primary recovery techniques are completed, a substantial amount of oil may be present in the reservoir, depending on the reservoir conditions. To recover this oil, secondary recovery techniques have been employed in the past. One of such secondary recovery techniques involves waterflooding, whereby water is injected into the porous rock, thereby displacing the brine and part of the oil in the portions of the formation contacted by the waterflood. As injected water invades the porous rock, an oil-water transition zone is created wherein the increasing saturation by the water causes the rupture of the continuous oil filaments. If the rock-oil-water system is preferentially water wet, the oil that remains is in the form of discontinuous globules or ganglia surrounded by rock and isolated by water. This oil is trapped by capillary forces and is normally referred to in the art as "residual oil". The residual oil communicates directly with water-saturated flow channels. It is known in the art that pores containing the residual oil contain very little water. The formation of the residual oil globules during the waterflooding process is dependent upon a number of criteria, such as oil-water interfacial tension and pore geometry. Tertiary oil recovery techniques have been developed in the past to recover this residual oil. In the tertiary oil recovery it is essential that the water in the water-saturated flow channels be replaced with a different fluid which interacts with the oil in the trapped ganglia and causes at least a part thereof to be displaced and coalesce with other similarly-displaced globules of oil to form a continuous oil stream which is forced to flow in the formation and then is recovered at the surface thereof, e.g., through a suitable well.

Various surfactants have been used in the past in the tertiary oil recovery techniques to cause the residual oil globules to be displaced and subsequently coalesce with other similarly-displaced oil globules to form a continuous oil flow, as described, e.g., by Reed et al, in "Some Physiochemical Aspects of Microemulsion Flooding: A Review", pages 383–437 of "Improved Recovery By Surfactant and Polymer Flooding", *AMERICAN INSTITUTE OF CHEMICAL ENGINEERS SYMPOSIUM ON IMPROVED OIL RECOVERY BY SURFACTANT AND POLYMER FLOODING*, Kansas City, Kans., 1976, Published by Academic Press, Inc., New York, 1977, the entire contents of which are incorporated herein by reference.

Petroleum sulfonates, usually obtained by subjecting hydrocarbons, such as crude oil or partially refined oil, to sulfonation conditions are known in the art as effective surface active agents used in enhanced oil recovery (EOR) applications. Various sulfonates and the use thereof as surface acting agents in the enhanced oil recovery applications are disclosed by Ahearn et al, U.S. Pat. No. 3,302,713, Patton, U.S. Pat. No. 3,373,808, Jones, U.S. Pat. No. 3,506,071, Gale, U.S. Pat. 3,861,466, and Aude et al, U.S. Pat. No. 4,290,973. Additionally, other materials known in the art can also be used as surfactants to free the oil and coalesce the dispersed globules thereof into a continuous stream. Such suitable other surfactants include, but are not limited to synthetic alkylaryl sulfonates, as described in U.S. Pat. No. 3,994,342; internal olefin and alpha-olefin sulfonates described in U.S. Pat. No. 4,549,607; propoxylated ethoxylated alcohol or alkylphenol ether sulfates and sulfonates described in U.S. Pat. No. 3,977,471; aliphatic and aromatic carboxylates described in U.S. Pat. No. 4,556,495; and nonionic surfactants, as described by Graciaa et al in the paper "Criteria for Structuring Surfactants to Maximize Solubilization of Oil and Water: Part 1-Commercial Nonionics", which appeared in *Soc of Petr Eng Journal* (Oct, 1982), 22, 743–749.

The entire contents of all of the above patents and publications are incorporated by reference herein.

The surfactants used in the large volumes necessary to recover a substantial proportion of the residual oil substantially increase the overall cost of oil recovery. Accordingly, it is important to minimize, when possible, the amount of the surfactant used to recover the residual oil from a particular formation. Similarly, mobility control polymers, also used in the past to control the flow of drive fluid and/or flooding fluids into the oil formation also add substantially to the overall cost of the oil recovery operation. Accordingly, it is also important to minimize the amount of such mobility control polymers used in the tertiary recovery operations.

Thus, a need still exists in the art for providing an improved process of recovering oil from underground formations wherein the amount of the surfactants and mobility control polymers used in the oil recovery process is substantially reduced.

SUMMARY OF THE INVENTION

A method of recovering oil from a subterranean oil formation having the vertical thickness of at least 40 feet utilizes at least one injection well and at least one production well spaced apart from the injection well. The method comprises the consecutive steps of:
(1) injecting a surfactant slug into the lower 50–75% vertical thickness of the oil column;
(2) injecting a slug of a mobility control polymer into the upper 50–75% portion of the vertical thickness of the oil column;
(3) injecting a drive fluid throughout substantially 100% of the vertical thickness of the oil column; and,
(4) recovering oil from the production well.

DETAILED DESCRIPTION OF THE INVENTION

The injection of the surfactant and the mobility control polymer slugs into the oil column at the vertical thickness regions specified herein promotes the maximum utilization efficiency of the surfactant and the mobility control polymer since the gravity forces acting on the respective slugs of these materials tend to maximize the recovery of the oil upon injection of a limited amount of chemicals into the underground formation. The surfactant desirably forms a middle phase microemulsion with the reservoir brine and oil. The density of the microemulsion is greater than that of the oil in the formation but lower than that of the water; accordingly, the microemulsion and oil released by the microemulsion tend to travel upwards in the vertical oil formation.

The polymer slug is injected after the surfactant slug into the upper 50 to 75% portion of the vertical thickness of the oil column because, at the time of the injection of the polymer slug, most of the oil in the formation is either located in the upper portion of the oil column or is migrating in that direction. Accordingly, the injection of the polymer slug into the upper region of the oil column maximizes the efficiency of the polymer. The injection of optional, additional slugs of diverse materials, discussed below, into the oil column at the relative vertical elevations, specified below, of the oil column is also designed to obtain maximum advantage from the gravitational forces acting on such slugs, thereby maximizing the efficiency of the injection thereof. The term "vertical thickness of the oil column", as used herein, designates the thickness of the portion of the formation containing the oil, measured in a vertical direction from the top to the bottom of that portion of the formation. To fully utilize the beneficial effect of the gravitational forces on the oil recovery in the method of this invention, the subterannean oil column must have the vertical thickness of at least about 40 feet, preferably at least about 100 feet. The oil formation comprising the oil column must additionally have the following characteristics: significant vertical permeability, desirably at least one-tenth or more of the horizontal permeability, and should not contain extensive shale laminations or other barriers to vertical fluid migration.

The surfactants used in the present invention are any of the well known surfactants used heretofore in enhanced oil recovery applications. Thus, sulfonates produced by sulfonating hydrocarbons can be used as the surfactants. Suitable sulfonates are those of Aude et al, U.S. Pat. No. 4,290,973, Ahearn et al, U.S. Pat. No. 3,302,713, Gale, U.S. Pat. No. 3,861,466 and Ahearn et al, U.S. Pat. No. 3,283,812, the entire contents of all of which are incorporated herein by reference. Suitable sulfonates used in the invention are those having a solubilization ratio of about three or higher. The solubilization ratio is defined as $V_o/V_s$, wherein $V_o$ is the volume of oil solubilized by a unit of volume of petroleum sulfonate reactant, $V_s$, in a middle phase microemulsion at "midpoint" or "optimal salinity". The solubilization ratio and the method of calculating thereof are described by Reed et al in the aforementioned paper entitled "Some Physiochemical Aspects of Microemulsion Flooding: A Review".

Other materials may also be used as surfactants. For example, synthetic alkylarylsulfonates, such as alkylbenzene-, alkyltoluene- or alkylxylene-sulfonates, e.g. Enordet LXS (linear alkyl ortho-xylene sulfonates) offered by Shell Chemical Company; internal olefin or alpha olefin sulfonates, as e.g. Enordet IOS or AOS series surfactants offered by Shell Chemical Company; ethoxylated alcohol ether sulfates or sulfonates, such as Shell Chemical Neodol 25-3S and Ethyl Corporation EOR 100, respectively; ethoxylated alkyl-phenol ether sulfates or sulfonates, such as Alipal CO 436 offered by GAF Corporation and Dodiflood V3620 offered by Hoechst chemical Co., respectively; propoxylated ethoxylated alcohol and alkylphenol ether sulfates and sulfonates, such as those described in U.S. Pat. No. 3,977,471, which are not yet offered as commercial surfactants; and ethoxylated alcohol and alkylphenol carboxylates, such as synperonic A3C and synperonic NP5C surfactants, respectively, offered by Imperial Chemical Industries. These and other surfactants proposed for use in enhanced oil recovery processes may be employed in gravity-assisted chemical flood process described herein.

The surfactant is normally used as a water additive in an aqueous solution, but may be injected as a water external microemulsion, or as an oil external microemulsion. Suitable concentrations of surfactants in the surfactant slug range from about 0.01% by weight to about 12% by weight, preferably about 0.1 to about 2.0% by weight. The upper limit of this range is usually determined by the solubility of the surfactant in a field brine, and by the fact that the use of larger concentrations may significantly increase the overall cost of the oil recovery operation. The aqueous solution of the surfactant may be formed prior to the injection of the solution into the formation or it may be formed in situ by injecting a separate stream of the surfactant into the aqueous water slug or slugs injected separately into the formation. The addition of the surfactant to the aqueous water slug may be continuous or discontinuous without departing from the scope of the invention, so long as the average concentrations of the surfactant in the surfactant slugs injected into the formation are maintained in the aforementioned range.

The surface-active character and oil displacement efficiency of the aqueous surfactant solution are substantially enhanced by incorporating into it small amounts of water-soluble salts, such as sodium, potassium or ammonium salts. As little as 0.1 weight % of sodium chloride, for example, may markedly improve the surface activity of petroleum or synthetic alkylaryl sulfonate mixtures. Preferred concentrations of sodium chloride for these surfactants which may optionally be used herein are between about 0.3 weight % to about 5 weight %, preferably about 0.4 weight % to about 2 weight %. Salt concentrations in excess of about 5 weight % become detrimental, since they tend to "salt out" these surfactants from the aqueous medium, thereby considerably reducing the effective concentration of surfactants at the flood front and rendering them less efficient. Desired salinity for surfactants, other than the synthetic or alkylaryl surfactants, which may be employed in this process may range up to about 15 to about 20%, depending upon the optimal salinity of the surfactant species. The injection of the surfactant slug is continued normally until 5 to 50 percent of the reservoir pore volume (PV) has been injected. The volume of surfactant injected will depend upon the surfactant concentration. The total surfactant injected, stated in terms of the product of the surfactant concentration (%) and slug size (% PV), is normally in the range of about 10 to about 100, preferably about 10 to about 50. The presence of polyvalent ions, such as calcium, in the water-surfactant mixtures of the invention is undesirable (if a petroleum or synthetic alkylaryl sulfonate surfactant is employed) and generally should be minimized. When this is not feasible, the aqueous solution of the surfactant should be treated appropriately so as to reduce the concentration of the polyvalent ions.

The mobility control polymer injected in the second step of the method of the present invention may be any one or a combination of the polymers well known in the art for controlling the mobility of the drive fluid slug, and it is injected into the formation after the injection of the surfactant slug is completed. The mobility control polymer slug prevents, or at least minimizes, fingering of drive fluid into the surfactant slug and the channeling of fluids into the more permeable regions of the formation, thereby directing most of the drive fluid into contact with the oil and recovering a substantial proportion of the oil. Suitable polymers used as the mobility control agents include, but are not limited to, xanthan gum or natural polysaccharide polymers, such as Xanflood polymer offered by Kelco, or polyacrylamide synthetic polymers, such as Dow Pusher polymers offered by Dow Chemical Company. Preferred polymers are partially hydrolyzed polyacrylamide or xanthan polysaccharide polymers. The concentration of the polymer in the second step of the invention is normally about 100 to about 3000 ppm, preferably about 300 to about 1000 ppm. The concentration will normally be sufficient to provide a polymer solution mobility ($k/\mu$) less than the minimum mobility of the oil/water bank being displaced. In this respect, k is the effective permeability of the oil column to the polymer solution of viscosity $\mu$. The injection of the mobility control polymer slug is continued until about 10% to about 100%, preferably about 10% to about 50% of the reservoir pore volume is injected.

The salinity of the mobility control polymer slug should be lower than the critical salinity for establishing a type III phase environment by the surfactant/brine/oil system of the reservoir. For a petroleum sulfonate or alkylaryl sulfonate surfactant, the salinity of the polymer drive solution is normally within the range of about 0.05 to about 2.0%, preferably within the range of about 0.2 to about 1.0%.

After the injection of the mobility control polymer slug is completed, a slug of drive fluid is injected substantially into the entire vertical thickness of the oil column. The drive fluid is any well known drive fluid used in the enhanced oil recovery applications. Thus, the drive fluid may be a gas or water which displaces the oil, previously freed by the surfactant injection, towards the production well. Normally, the drive fluid is water, or brine which may contain additives, such as alcohol or sacrificial agents employed to minimize retention of surfactant and polymers. The injection of the drive fluid is continued to effect the displacement of formation oil through the production well until either all of the oil has been displaced from the formation or until the economical limit of the ratio of the drive fluid to formation oil has been reached. In a preferred embodiment, using petroleum or synthetic sulfonate surfactants, the drive fluid is low salinity water, having the salinity, i.e., the salt concentration, of about 0.05% to about 2.0%, preferably about 0.2 to about 1.0%.

If the method of the present invention employs a petroleum or alkylaryl sulfonate to recover oil from an oil formation containing high salinity brine (3% or more), it is necessary to inject a low salinity pre-flush slug, prior to the injection of the surfactant, substantially into the entire vertical thickness of the oil column and, if the oil column is positioned on top of an underlying high salinity aquifer in communication with the oil column, into some portion of the aquifer immediately underlying the line of the oil-water contact. The function of the low salinity pre-flush slug is to displace the high salinity water in the formation away from the vicinity of injection wells, so that the subsequently-injected surfactant in the surfactant slug is not precipitated by the high salinity water. The composition of the low salinity pre-flush slug is such that it establishes an optimal salinity level within the oil column for the operation of the surfactant injected thereafter. The pre-flush slug comprises a low salinity water, typically fresh water to which sodium chloride has been added, or a softened field brackish water. The salinity of the pre-flush slug is generally about 0.1 to about 5.0% by weight, but for petroleum or alkylaryl sulfonates it is preferably about 0.4 to about 2.0% by weight. The amount of the low-salinity pre-flush slug injected is about 0.1 to about 1.0 pore volumes of the oil reservoir, depending upon reservoir characteristics, preferably it is about 0.2 to about 0.5 of the oil reservoir pore volume. The fractional height of the aquifer included in the pre-flush injection depends upon such reservoir factors as specific permeability of the rock, the ratio of the vertical to horizontal permeability, defined as permeability measured in the vertical direction to permeability measured horizontally to the reservoir layering (strata), reservoir thickness, well spacing, salinity of the aquifer, fraction of the oil-bearing reservoir volume to be surfactant-flooded and other factors peculiar to each oil reservoir, as will be apparent to those skilled in the art, and which will dictate the depth in the aquifer to which the pre-flush slug must be injected. However, the vertical portion of the aquifer, adjoining the oil column, to be pre-flushed is usually at least 10% and not more than 50% of the height of the oil column. The low-salinity, pre-flush slug is designated herein as step (A) and, if employed, it is injected in the method of the present invention immediately ahead of step 1, or step A1, alkaline pre-treat solution injection, if the latter is employed.

Optionally, the concentration of the divalent ions remaining within the reservoir after the pre-flush slug may be reduced by injecting a slug of an alkaline pre-treat solution into the formation. Such an alkaline pre-treat solution may contain any well known agents, used in the past to remove or neutralize divalent ions, dissolved in an aqueous base. Suitable agents are sodium carbonate or sodium orthosilicate, and the concentration of such agents in the pre-treat solution is generally in the range of 0.1 to 1.0%, desirably in the range of 0.2 to 0.5%. The alkaline agents may be supplemented by added NaCl to adjust total salinity of the pretreat slug to near optimal salinity of the surfactant utilized in the process. The alkaline pre-treat solution may be injected into the formation normally until 5 to 50% of a pore volume (desirably 10 to 20% PV) has been injected. The alkaline pre-treat solution injection step is referred to herein as step (A1) and it is conducted immediately before step (1) of the method of the present invention. The alkaline pretreat solution is injected into the entire vertical thickness of the oil formation.

If the process of the invention is used to recover oil from an oil formation positioned on top of the aquifer, the alkaline pre-treat solution is not injected into the aquifer.

The salinities of the low salinity pre-flush solution, surfactant slug, and polymer drive are generally selected to maintain the surfactant in a Type III phase environment over as long a distance as practical. The middle and upper phase microemulsions produced within the Type III phase environment are less dense than brine and more dense than oil. Accordingly, they will tend to migrate upward towards the existing oil-water boundary in the reservoir, releasing oil previously trapped by capillary forces in the lower portion of the oil column as it is contacted. The released oil will also tend to migrate upwardly to the top of the reservoir. In this connection, the term "Type III Phase Environment" is used herein to designate the salinity interval in which a three phase system consisting of brine, a middle phase microemulsion, and oil may be formed by mixing the surfactant, the oil, and the brine with the reservoir.

For the purposes of exemplification, set forth below are the concentration and salinity limits, in % by weight, for the various slugs used in the process of the invention utilizing petroleum or alkylaryl sulfonate surfactants.

|  | General Range | Preferred Range |
| --- | --- | --- |
| Preflush Salinity (1) | 0.1–5.0% | 0.4–2.0% |
| Pretreat Salinity (incl. alk. agt.) (1) | 0.3–5.0% | 0.4–2.0% |
| Pretreat Alk. Conc. | 0.1–1.0% | 0.2–0.5% |
| Surfactant Conc. | 0.01–12% | 0.1–2.0% |
| Surfactant Salinity (2) | 0.3–5.0% | 0.4–2.0% |
| Polymer Conc. | 100–3000 ppm ACT. | 300–1000 ppm ACT |
| Polymer Salinity (3) | 0.05–2.0% | 0.2–1.0% |
| Drive Salinity (4) | 0.05–2.0% | 0.2–1.0% |

(1) Preferred pre-flush and pretreat salinity is marginally higher than the optimal salinity for the surfactant employed. Pretreat salinity includes concentration of alkaline sacrificial agent, if any, and added NaCl.
(2) Preferred surfactant salinity is near optimal salinity for the surfactant employed - or within the range of the critical lower salinity for Type III phase environment (lower limit) to the optimal salinity (upper limit).
(3) Preferred salinity for polymer drive is marginally lower than the critical lower salinity for Type III phase environment.
(4) The salinity may grade downward to a limiting lower salinity needed to prevent damage to injection wells from swelling clays.

In a preferred embodiment, the method of the present invention is conducted in an oil formation perforated by at least one injection well and at least one production well spaced apart from the injection well, with the two wells being in communication with each other.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

We claim:

1. A method of recovering oil from a subterranean oil formation having the vertical thickness of at least about 40 feet, comprising an oil column which is a portion of the formation containing the oil, the formation containing at least one injection well and at least one production well spaced-apart from said injection well, comprising the consecutive steps of:
   (1) injecting a surfactant slug into the lower 50 to 75% vertical thickness of the oil column;
   (2) injecting a slug of a mobility control polymer into the upper 50 to 75% portion of the vertical thickness of the oil column;
   (3) injecting a slug of a drive fluid over substantially the entire vertical thickness of the oil column; and,
   (4) recovering oil from the production well.

2. A method of claim 1 wherein, prior to said step (1), there is conducted the following step:
   (A) injecting a pre-flush slug of a relatively low salinity water into the entire vertical thickness of the oil column.

3. A method of claim 2 wherein the pre-flush slug comprises a sodium chloride solution or softened field water and has the salinity of about 0.1 to about 5.0%.

4. A method of claim 3 wherein the surfactant slug comprises an aqueous solution of petroleum or alkylaryl sulfonate surfactants.

5. A method of claim 4 wherein the mobility control polymer comprises an aqueous solution of partially hydrolyzed polyacrylamide or xanthan polysaccharide polymers.

6. A method of claim 5 wherein, subsequently to said step (A), but prior to said step (1), there is conducted the following step:
   (A1) injecting an alkaline pre-treat solution slug substantially into the entire vertical thickness of the oil column.

7. A method of claim 6 wherein the alkaline pre-treat solution slug comprises an aqueous solution of the sodium carbonate or sodium orthosilicate.

8. A method of claim 5 wherein the drive fluid is a field brine, fresh water or a mixture thereof of salinity lower than necessary to produce a Type III phase environment for the surfactant/brine/oil system of the reservoir.

9. A method of claim 7 wherein the drive fluid is a field brine, fresh water or a mixture thereof of salinity lower than necessary to produce a Type III phase environment for the surfactant/brine/oil system of the reservoir.

10. A method of claim 8 wherein the salinity of the pre-flush slug is about 0.4 to about 2.0%.

11. A method of claim 10 wherein the salinity of the surfactant slug is about 0.4 to about 2.0%.

12. A method of claim 11 wherein the salinity of the slug of the mobility control polymer is about 0.2 to about 1.0%.

13. A method of claim 9 wherein the salinity of the pre-flush slug is about 0.4 to about 2.0%.

14. A method of claim 13 wherein the salinity of the surfactant slug is about 0.4 to about 2.0%.

15. A method of claim 14 wherein the salinity of the slug of the mobility control polymer is about 0.2 to about 1.0%.

16. A method of claim 2 wherein the oil column is in contact with an underlying body of water, and wherein the pre-flush slug is injected into at least a portion of the underlying body of water.

17. A method of claim 16 wherein the pre-flush slug is injected into a vertical thickness portion of the underlying body of water which is at least 10% of the vertical thickness of the oil column.

18. A method of claim 17 wherein the pre-flush slug is injected into a vertical thickness portion of the underlying body of water which is 50% or less of the vertical thickness of the oil column.

19. A method of claim 18 wherein the pre-flush slug comprises a sodium chloride solution or softened field water and has the salinity of about 0.1 to about 5.0%.

20. A method of claim 19 wherein the surfactant slug comprises an aqueous solution of petroleum or alkylaryl sulfonate surfactants.

21. A method of claim 20 wherein the mobility control polymer comprises an aqueous solution of partially hydrolyzed polyacrylamide or xanthan polysaccharide polymers.

22. A method of claim 21 wherein, subsequently to said step (A), but prior to said step (1), there is conducted the following step:
   (A1) injecting an alkaline pre-treat solution slug substantially into the entire vertical thickness of the oil column.

23. A method of claim 22 wherein the alkaline pre-treat solution slug comprises an aqueous solution of sodium carbonate or sodium orthosilicate.

24. A method of claim 21 wherein the drive fluid is a field brine, fresh water or a mixture thereof of salinity lower than necessary to produce a Type III phase environment for the surfactant/brine/oil system of the reservoir.

25. A method of claim 23 wherein the drive fluid is a field brine, fresh water or a mixture thereof of salinity lower than necessary to produce a Type III phase environment for the surfactant/brine/oil system of the reservoir.

26. A method of claim 24 wherein the salinity of the pre-flush slug is about 0.4 to about 2.0%.

27. A method of claim 26 wherein the salinity of the surfactant slug is about 0.4 to about 2.0%.

28. A method of claim 27 wherein the salinity of the slug of the mobility control polymer is about 0.2 to about 1.0%.

29. A method of claim 25 wherein the salinity of the pre-flush slug is about 0.4 to about 2.0%.

30. A method of claim 29 wherein the salinity of the surfactant slug is about 0.4 to about 2.0%.

31. A method of claim 30 wherein the salinity of the slug of the mobility control polymer is about 0.2 to about 1.0%.

* * * * *